United States Patent
Mazara Diaz et al.

(10) Patent No.: US 9,166,383 B2
(45) Date of Patent: Oct. 20, 2015

(54) LOAD CENTER AND SWITCHGEAR MOUNTING ASSEMBLY THEREFOR

(71) Applicant: EATON CORPORATION, Cleveland, OH (US)

(72) Inventors: Hoyma Joel Mazara Diaz, Distrito Nacional (DO); Mario Nunez Hernandez, Santo Domingo Oeste (DO); Glennys Johanny De Jesus Reyes, San Cristobal (DO); Sandy Omar Jimenez Gonzalez, Monaca, PA (US)

(73) Assignee: EATON CORPORATION, Cleveland, OH (US)

( * ) Notice: Subject to any disclaimer, the term of this patent is extended or adjusted under 35 U.S.C. 154(b) by 143 days.

(21) Appl. No.: 14/189,285

(22) Filed: Feb. 25, 2014

(65) Prior Publication Data

US 2015/0244153 A1    Aug. 27, 2015

(51) Int. Cl.
*H02B 1/00* (2006.01)
*H02B 1/50* (2006.01)
*H02B 1/20* (2006.01)

(52) U.S. Cl.
CPC ... *H02B 1/50* (2013.01); *H02B 1/20* (2013.01)

(58) Field of Classification Search
CPC ............ H02B 1/04; H02B 1/052; H02B 1/30; H02B 1/32; H02B 1/40; H02B 1/42; H02B 1/46; H02B 1/48; H02B 1/50
USPC ......... 361/631, 634, 636, 637, 643, 647, 648, 361/652, 656
See application file for complete search history.

(56) References Cited

U.S. PATENT DOCUMENTS

| | | | |
|---|---|---|---|
| 7,695,313 B2 | 4/2010 | Karim et al. | |
| 7,969,750 B2 | 6/2011 | Jur et al. | |
| 8,089,747 B2 | 1/2012 | Storck et al. | |
| 8,395,885 B2 | 3/2013 | Maloney | |

FOREIGN PATENT DOCUMENTS

DE            2700472 A1 *  7/1978  ............... H02B 1/21

* cited by examiner

*Primary Examiner* — Zachary M Pape
(74) *Attorney, Agent, or Firm* — Eckert Seamans Cherin & Mellott, LLC; Grant E. Coffield

(57) ABSTRACT

A switchgear mounting assembly for a load center includes a base assembly, an electrical bus assembly, and a bracket. The base assembly includes a base and a central protrusion extending outwardly from the base. Bus bars are electrically connected and mechanically coupled to the central protrusion and include stabs, which extend radially outwardly from the central protrusion. The bracket is coupled to the central protrusion and includes supporting elements. Each supporting element maintains a corresponding electrical switching apparatus in electrical communication with a corresponding one of the stabs. The switchgear mounting assembly is therefore structured to mount the electrical switching apparatus in a radial array extending around the central protrusion.

20 Claims, 4 Drawing Sheets

LOAD CENTER AND SWITCHGEAR MOUNTING ASSEMBLY THEREFOR

BACKGROUND

1. Field

The disclosed concept pertains generally to electrical systems and, more particularly, to load centers. The disclosed concept also relates to switchgear mounting assemblies for load centers.

2. Background Information

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers).

The electrical enclosure is typically coupled to and supported by a structure such as, for example, a wall of a building, and includes a number of electrical bus members. A panelboard, for example, typically includes an elongated rectangular electrical enclosure wherein the bus electrical bus members run longitudinally between the top and the bottom of the rectangular enclosure. A plurality of circuit breakers are mechanically coupled and electrically connected to corresponding electrical bus members by electrical connector assemblies, such as clip members or a number of separate fasteners that are structured to mechanically couple the circuit breakers to a contact stab of the desired electrical bus member. Thus, the circuit breakers are arranged in a linear or "in-line" configuration within the enclosure.

Among other disadvantages, such designs require a relatively high part count (e.g., without limitation, fasteners; connectors; buses; panels), which can complicate the fabrication process, as well as make the assembly process complex and time-consuming. In addition, some prior art designs suffer from issues relating to poor mechanical and electrical connectivity between the circuit breakers and electrical bus members or stabs. Known load centers are also relatively large and require a separate supporting structure, such as the aforementioned wall of a building in order to support the elongated rectangular enclosure and electrical components enclosed therein. Further, the elongated rectangular enclosure is typically disposed within a corresponding prefabricated recess in the wall, in order to attempt to generally conceal the load center. These and other issues add to the cost and complexity associated with known load centers.

There is, therefore, room for improvement in load centers and in switchgear mounting assemblies therefor.

SUMMARY

These needs and others are met by embodiments of the disclosed concept, which are directed to a switchgear mounting assembly for a load center, which among other benefits, provides for a reduced footprint by arranging electrical switching apparatus in a radial array (i.e., a generally circular layout) as opposed to a conventional linear (i.e., in-line) arrangement.

As one aspect of the disclosed concept, a switchgear mounting assembly is provided for a load center. The load center comprises a plurality of electrical switching apparatus. The switchgear mounting assembly comprises: a base assembly comprising a base and a central protrusion extending outwardly from the base; an electrical bus assembly comprising a number of bus bars electrically connected and mechanically coupled to the central protrusion, each of the bus bars including a plurality of stabs extending radially outwardly from the central protrusion; and a bracket coupled to the central protrusion and including a plurality of supporting elements each being structured to maintain a corresponding one of the electrical switching apparatus in electrical communication with a corresponding one of the stabs. The switchgear mounting assembly is structured to mount the electrical switching apparatus in a radial array extending around the central protrusion.

As another aspect of the disclosed concept, a load center comprises: a switchgear assembly including a plurality of electrical switching apparatus; and a switchgear mounting assembly comprising: abuse assembly comprising a base and a central protrusion extending outwardly from the base, an electrical bus assembly comprising a number of bus bars electrically connected and mechanically coupled to the central protrusion, each of the bus bars including a plurality of stabs extending radially outwardly from the central protrusion, and a bracket coupled to the central protrusion and including a plurality of supporting elements each being structured to maintain a corresponding one of the electrical switching apparatus in electrical communication with a corresponding one of the stabs. The switchgear mounting assembly is structured to mount the electrical switching apparatus in a radial array extending around the central protrusion.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "fastener" shall mean a separate component or components which is/are employed to tighten two or more components together, and expressly includes but is not limited to, screws, bolts and the combinations of bolts and nuts (e.g., without limitation, lock nuts) and bolts, washers and nuts.

As employed herein, the term "processor" shall mean a programmable analog and/or digital device that can store, retrieve, and process data; a printed circuit board; an energy monitoring and control board; a computer; a controller; a workstation; a personal computer; a microprocessor; a microcontroller; a microcomputer; a central processing unit; a mainframe computer; a mini-computer; a server; a networked processor; a combination of the foregoing; or any suitable processing device or apparatus.

As employed herein, the statement that two or more parts are "connected" or "coupled" together shall mean that the parts are joined together either directly or joined through one or more intermediate parts.

As employed herein, the term "number" shall mean one or an integer greater than one (i.e., a plurality).

Figure 1:
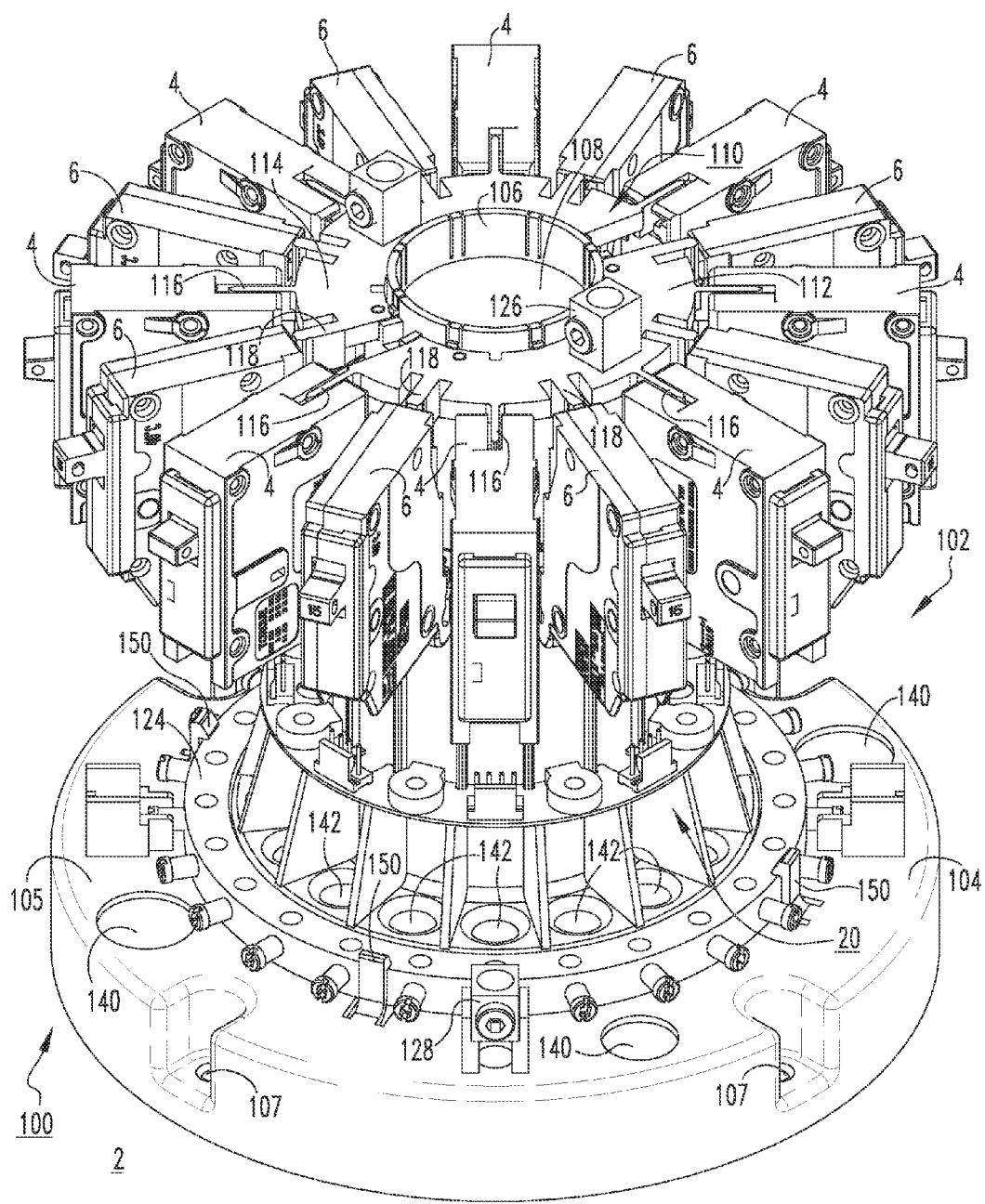
FIG. 1 is an isometric view of a portion of a load center and a switchgear mounting assembly therefor, in accordance with an embodiment of the disclosed concept.
Figure 3:
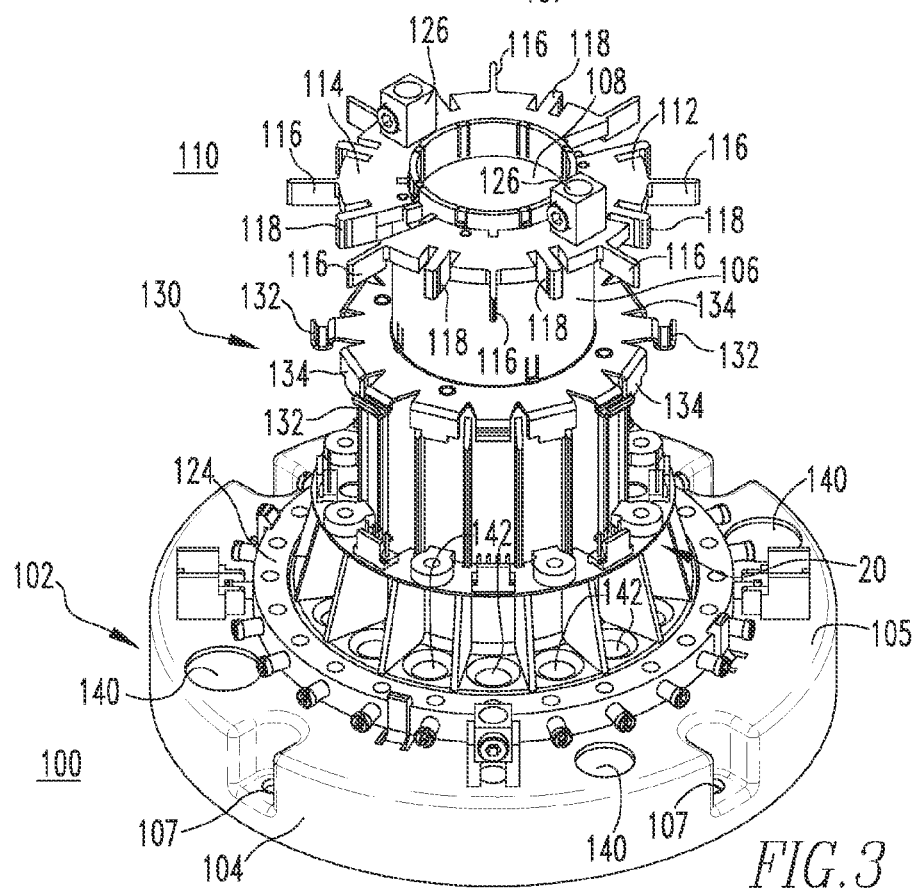
FIG. 3 is an isometric view of the portion of the load center and switchgear mounting assembly therefor of FIG. 2, with all of the circuit breakers removed to further show underlying structures.

FIG. 1 shows a switchgear mounting assembly 100 for suitably mounting a plurality of electrical switching apparatus 4,6 in a radial array 10 within a. load center 2, in accordance with the disclosed concept. The switchgear mounting assembly 100 includes a base assembly 102 having a base 104 and a central protrusion 106. As best shown in FIG. 3, which illustrates the example switchgear mounting assembly 100 with the electrical switching apparatus 4,6 having been removed, the central protrusion 106 extends outwardly from the base 104 at the center thereof An electrical bus assembly 110, which includes a number of bus bars 112,114 (two are shown), is electrically connected and mechanically coupled to the central protrusion 106. Each of the bus bars 112,114 includes a plurality of stabs 116,118, which extend radially outwardly from the central protrusion 106, as best shown in FIG. 3.

Figure 2:
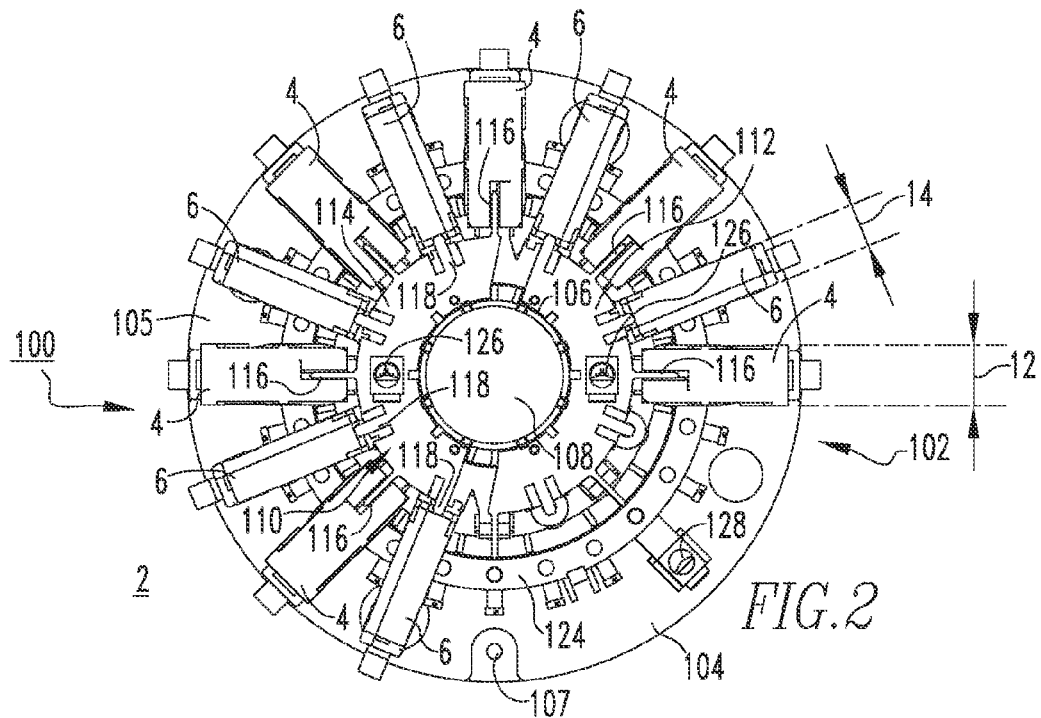
FIG. 2 is a top plan view of the portion of the portion of the load center and switchgear mounting assembly of FIG. 1, modified to remove a number of circuit breakers to show underlying structures.

Continuing to refer to FIG. 3, a bracket 130 is also coupled to the central protrusion 106, and includes a plurality of supporting elements 132,134. Each supporting element 132, 134 is structured to maintain a corresponding one of the electrical switching apparatus 4,6, respectively, in electrical communication with a corresponding one of the stabs 116, 118, as shown in FIG. 1. FIG. 2 shows a top plan view of the switchgear mounting assembly 100 with several of the electrical switching apparatus 4,6 having been removed, and FIG. 3 shows all of the electrical switching apparatus 4,6 having been removed from the switchgear mounting assembly 100, as previously discussed.

It will, therefore, be appreciated that the disclosed switchgear mounting assembly 100 functions to mount the electrical switching apparatus, which in the example shown and described herein are circuit breakers 4,6, in a radial array 10 extending around the central protrusion 106, as best shown in a top plan view of FIG. 2. In other words, the disclosed concept provides tier a generally circular layout and, therefore, a form factor of the load center 2 having a reduced footprint as compared, for example, to conventional load centers (not shown) having a traditional linear or in-line layout. The unique radial array arrangement of the disclosed concept is also relatively easy to assemble. For example and without limitation, among other benefits, the design allows for a top-down assembly of the circuit breakers 4,6 to corresponding stabs 116,118, respectively, and a minimal number of fasteners. As will be further discussed hereinbelow, the example switchgear mounting assembly 100 also integrates a number of advantageous features, such as energy monitoring and load control for automation with remotely operated circuit breakers and relays, snap-in or resilient connecting features to further eliminate or minimize the use and requirement of separate fasteners, and various knockouts, through holes and passageways for minimizing the amount of electrical wiring required. In additional to providing for a substantial space reduction, the disclosed switchgear mounting assembly 100 also provides better alignment of features and, therefore, electrical connectivity between components of the load center 2.

The bus bars 112,114 can be fabricated using any known or suitable method or process, including without limitation, machining, extruding, die casting and the like. The unique bus bar design, which is best shown in FIG. 3, also advantageously serves to function as a heat sink, thereby dissipating unwanted or excessive heat.

The aforementioned bracket 130 functions to hold the circuit breakers 4,6 in their "plug-in" position on corresponding stabs 116,118, respectively, of the bus bars 112,114. The bracket 130 also offers structural rigidity and easy installation. It will be appreciated that the load center 2 can accommodate both plug-in and bolt-on circuit breakers.

It will further be appreciated that any known or suitable alternative type, number and/or configuration of electrical switching apparatus other than the circuit breakers 4,6, shown, could be employed, without departing from the scope of the disclosed concept. In the example shown and described herein, it will be appreciated that two different types of circuit breakers 4,6 are attached to the switchgear mounting assembly 110 of the load center 2. Specifically, a plurality of first circuit breakers 4 each having a first width 12 (FIG. 2) is attached to each of the stabs 116 of the bus bars 112,114. A plurality of second circuit breaker 6, each having a second width 14, which is different from the first width 12, is attached to corresponding stabs 118 of the bus bars 112,114. Thus, as shown in FIGS. 1 and 2, in one non-limiting embodiment of the disclosed concept, the first and second circuit breakers 4,6 are mechanically coupled and electrically connected to the switchgear mounting assembly 100 in an alternating arrangement. In other words, every other circuit breaker 4,6 has a different width 12,14, respectively, as shown. Among other advantages, this enables the overall size (e.g., without limitation, circumference) of the load center 2 to be further reduced, because the circuit breakers 4,6, can be arranged in a closer relationship around the central protrusion 106. In one non-limiting embodiment, the first circuit breakers 4 have a width of about 1 inch, whereas the second circuit breakers 6 have a smaller width 14 of about 0.75 inches. It will be appreciated, however, that the circuit breakers 4,6, or other known or suitable electrical switching apparatus (not shown), could have any known or suitable alternative dimensions and/or configuration.

Figure 4:
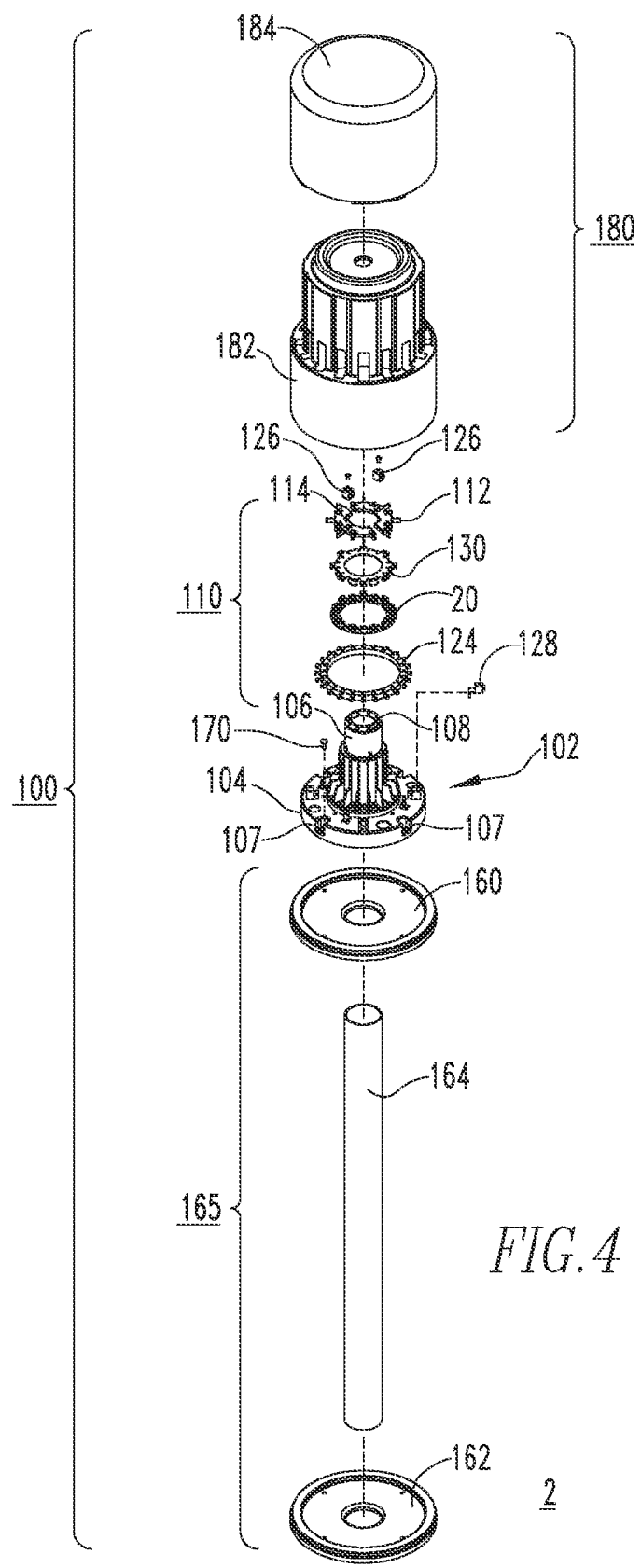
FIG. 4 is an exploded isometric view of the load center and switchgear mounting assembly therefor.

Continuing to refer to FIGS. 1-3, and also to FIG. 4, it will be appreciated that the example central protrusion 106 is an elongated tubular member, which has a central opening 108. Such opening 108 can serve, for example and without limitation, as a wireway for wire conductors (not shown) that may be required for connectivity among components of the load center 2. The base 104 of the example switchgear mounting assembly 100 includes a radial flange 105 having a plurality of mounting holes 107. The base 104 also includes a number of knockouts 140, which are disposed in and extend through the flange 105, as well as through holes 142. The knockouts 140 and through holes 142 provide additional wireways for electrically conductive wiring within the load center 2. In this manner, such features serve to provide a more direct route for electrical connection between components within the load center 2 and, therefore, to minimize the amount of corresponding wire required.

As best shown in FIGS. 3 and 4, the electrical bus assembly 110 further includes a neutral bus 124, a number of line lugs 126 (two are shown , and a number of neutral lugs 1128 (one is shown). In the example shown, the line lugs 126 are mechanically coupled and electrically connected to corresponding bus bars 112,114. Each of the neutral lugs 128 is mechanically coupled and electrically connected to the base 104. The example neutral bus 124 comprises a ring, which is disposed on the base 104 such that the central protrusion 106 extends through the ring 124. The ring 124 is disposed on the upper surface of the base flange 105, and is secured to the base 104 using a number of integral resilient connectors 150. In the example shown and described herein, the resilient connectors 1150 comprise a plurality of resilient tabs structured to connect the neutral bus ring 124 to the base 104, without requiring a number of separate fasteners.

Figures 5, 6:
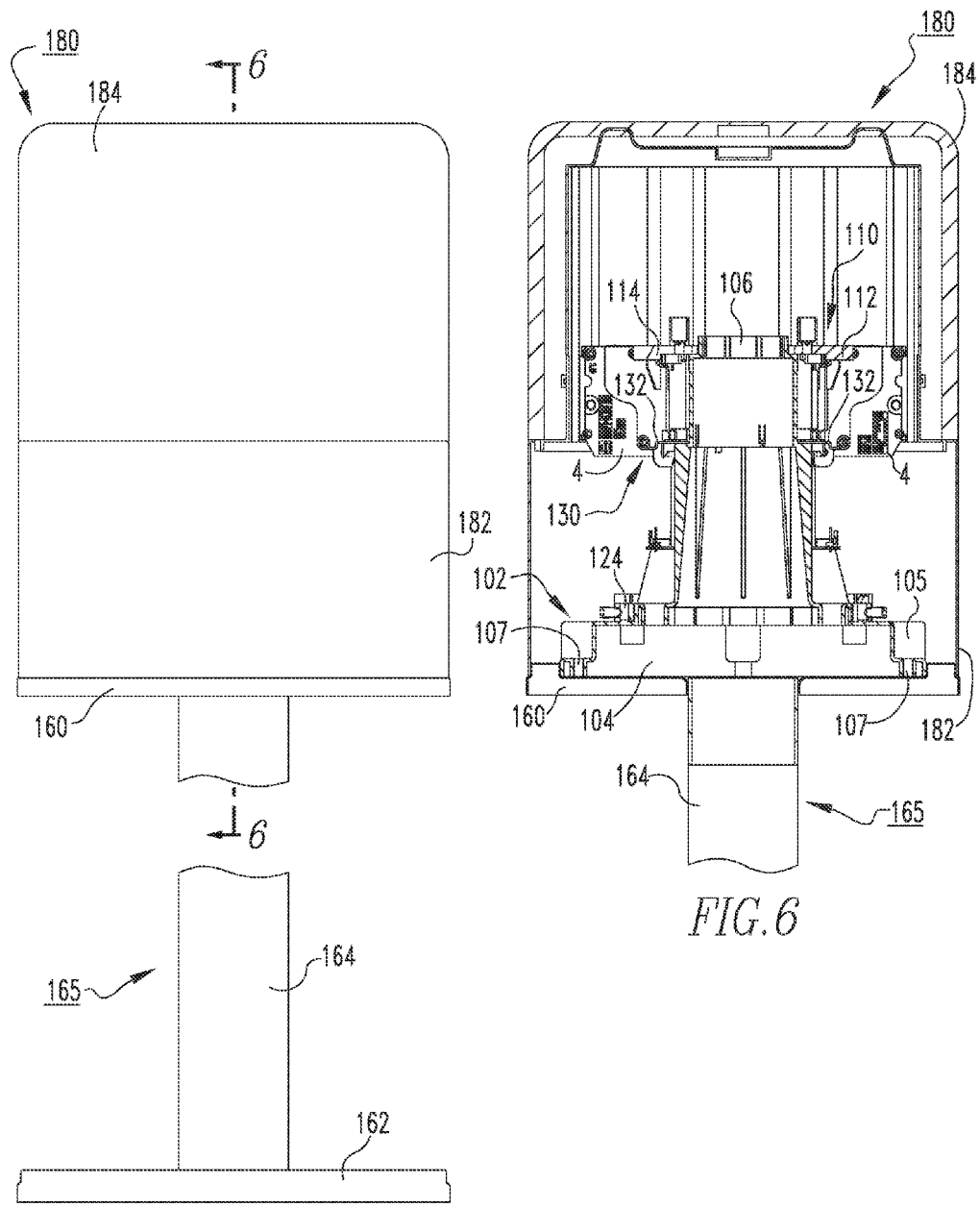
FIG. 5 is an assembled side elevation view of the load center and switchgear mounting assembly therefor of FIG. 4.
FIG. 6 is a section view taken along line 6-6 of FIG. 5.

Continuing to refer to FIG. 4, and also to FIGS. 5 and 6, the base assembly 102 preferably further includes a number of mounting members 160,162,164 and a plurality of fasteners 170. The fasteners 170 extend through the aforementioned mounting holes 107 in the radial flange 105 of the base 104 to fasten the base 104 to a corresponding one of the mounting members 160.

The mounting members may include any known or suitable number and/or configuration of components for suitably mounting the load center 2 in a desired manner. For example and without limitation, in the example shown, the mounting members comprise a pedestal assembly 165, which has a pair of mounting plates 160,162 and an elongated post 164 for mounting the base 104 to the elongated post 160. Thus, it will be appreciated that in one non--limiting embodiment, the load center 2 could be installed as a standalone pedestal assembly. In any event, it will be appreciated that the load center 2 and, in particular, the switchgear mounting assembly 100 thereof, can advantageously be installed on a horizontal surface, or as a pedestal. Thus, the disclosed load center 2 provides for an entirely new product having an entirely new and distinct look and configuration. Among other benefits, this, along with the reduced size of the load center 2, makes it more likely to blend into its surrounding environment and, in any event, occupy less space than traditional load center designs.

The example toad center 2 further includes a cover assembly 180. In the example of Figures 4-6, the cover assembly 180 includes first cover member 182 and a second cover member 184. The first cover member 182 is coupled to corresponding mounting member 160, and the second cover member 184, which is a generally cylindrical member, is structured to at least partially overlay the first cover member 182, as best shown in the section view of FIG. 6.

It will be appreciated that a wide variety of additional and/or alternative components and accessories could be employed in combination with the aforementioned load center 2 and switchgear mounting assembly 100. For example and without limitation, it is within the scope of the disclosed concept to provide energy monitoring and control capabilities, for example and without limitation, to allow automation with the use of such devices as remote operated circuit breakers and relays. In the non-limiting example embodiment shown and described herein, the switchgear assembly further comprises a processor 20, which may, for example and without limitation, be in the form of an energy monitoring and control board (e.g., without limitation, printed circuit board), which can be coupled to the base assembly 102. In the example shown, such energy monitoring and control board 20 is suitably coupled to the central protrusion 106, between the base 104 and the circuit breakers 4,6. It will, however, be appreciated that any known or suitable alternative, or additional, electrical components could be used in conjunction with the disclosed switchgear mounting assembly 100 and load center 2.

While specific embodiments of the disclosed concept have been described detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A switchgear mounting assembly for a load center, said load center comprising a plurality of electrical switching apparatus, said switchgear mounting assembly comprising:
   a base assembly comprising abuse and a central protrusion extending outwardly from said base;
   an electrical bus assembly comprising a number of bus bars electrically connected and mechanically coupled to said central protrusion, each of said bus bars including a plurality of stabs extending radially outwardly from said central protrusion; and
   a bracket coupled to said central protrusion and including a plurality of supporting elements each being structured to maintain a corresponding one of said electrical switching apparatus in electrical communication with a corresponding one of said stabs,
   wherein said switchgear mounting assembly is structured to mount said electrical switching apparatus in a radial array extending around said central protrusion.

2. The switchgear mounting assembly of claim 1 wherein said central protrusion is an elongated tubular member having a central opening.

3. The switchgear mounting assembly of claim 1 wherein said base includes a number of knockouts and through holes.

4. The switchgear mounting assembly of claim 1 wherein said electrical bus assembly further comprises a neutral bus, a number of line lugs, and a number of neutral lugs; wherein each of said line lugs is mechanically coupled and electrically connected to a corresponding one of said bus bars; and wherein each of said neutral lugs is mechanically coupled and electrically connected to said base.

5. The switchgear mounting assembly of claim 4 wherein said neutral bus comprises a ring; wherein said ring is disposed on said base; and wherein said central protrusion extends through said ring.

6. The switchgear mounting assembly of claim 5 wherein said base includes a number of resilient connectors; and wherein said resilient connectors connect said ring to said base without requiring a number of separate fasteners.

7. The switchgear mounting assembly of claim 1 wherein said base assembly further comprises a number of mounting members and a plurality of fasteners; wherein said base includes a radial flange having a plurality of mounting holes; and wherein said fasteners extend through said mounting holes to fasten said base to a corresponding one of said mounting members.

8. The switchgear mounting assembly of claim 7 wherein said mounting members comprise a pedestal assembly; and wherein said pedestal assembly includes a number of mounting plates and an elongated post, one of said number of mounting plates for mounting said base to said elongated post.

9. The switchgear mounting assembly of claim 7 wherein said base assembly further comprises a cover assembly structured to cover said plurality of electrical switching apparatus.

10. The switchgear mounting assembly of claim 9 wherein said cover assembly comprises a first cover member and a second cover member; wherein said first cover member is coupled to a corresponding one of said mounting members; and wherein said second cover member is a generally cylindrical member structured to at least partially overlay said first cover member.

11. A load center comprising:
   a switchgear assembly including a plurality of electrical switching apparatus; and
   a switchgear mounting assembly comprising:
      a base assembly comprising a base and a central protrusion extending outwardly from said base,
      an electrical bus assembly comprising a number of bus bars electrically connected and mechanically coupled to said central protrusion, each of said bus bars including a plurality of stabs extending radially outwardly from said central protrusion, and
      a bracket coupled to said central protrusion and including a plurality of supporting elements each being structured to maintain a corresponding one of said electrical switching apparatus in electrical communication with a corresponding one of said stabs,
      wherein said switchgear mounting assembly is structured to mount said electrical switching apparatus in a radial array extending around said central protrusion.

12. The load center of claim 11 wherein said central protrusion is an elongated tubular member having a central opening.

13. The load center of claim 11 wherein said electrical bus assembly further comprises a neutral bus, a number of line lugs, and a number of neutral lugs; wherein said neutral bus is a ring; wherein said ring is disposed on said base; wherein said central protrusion extends through said ring; wherein each of said line lugs is mechanically coupled and electrically connected to a corresponding one of said bus bars; and wherein each of said neutral tugs is mechanically coupled and electrically connected to said base.

14. The load center of claim 13 wherein said base includes a number of resilient connectors; and wherein said resilient connectors connect said ring to said base without requiring a number of separate fasteners.

15. The load center of claim 11 wherein said base assembly further comprises a number of mounting members and a plurality of fasteners; wherein said base includes a radial flange having a plurality of mounting holes; and wherein said fasteners extend through said mounting holes to fasten said base to a corresponding one of said mounting members.

16. The load center of claim 15 wherein said mounting members comprise a pedestal assembly; and wherein said pedestal assembly includes a number of mounting plates and an elongated post, one of said number of mounting plates for mounting said base to said elongated post.

17. The load center of claim 15 wherein said base assembly further comprises a cover assembly structured to cover said plurality of electrical switching apparatus.

18. The load center of claim 17 wherein said cover assembly comprises a first cover member and a second cover member; wherein said first cover member is coupled to a corresponding one of said mounting members; and wherein said second cover member is a generally cylindrical member structured to at least partially overlay said first cover member.

19. The load center of claim 11 wherein said switchgear assembly further comprises a processor; and wherein said processor is an energy monitoring and control board coupled to said base assembly.

20. The load center of claim 11 wherein said plurality of electrical switching apparatus is a plurality of first circuit breakers and a plurality of second circuit breakers; wherein each of said first circuit breakers has a first width; wherein each of said second circuit breakers has a second width different from the first width; and wherein said first circuit breakers and said second circuit breakers are mechanically coupled and electrically connected to said central protrusion of said switchgear mounting assembly in an alternating arrangement.

* * * * *